United States Patent
Loos et al.

(10) Patent No.: US 9,352,732 B2
(45) Date of Patent: May 31, 2016

(54) ANTI-BLOCKING SYSTEM FOR A VEHICLE WITH ELECTROMOTIVE VEHICLE DRIVE

(75) Inventors: Sebastian Loos, Aachen (DE); Dirk Hirschmann, Dachau (DE); Bodo Kleickmann, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 149 days.

(21) Appl. No.: 14/116,002

(22) PCT Filed: Feb. 28, 2012

(86) PCT No.: PCT/EP2012/000853
§ 371 (c)(1),
(2), (4) Date: Mar. 19, 2014

(87) PCT Pub. No.: WO2012/152348
PCT Pub. Date: Nov. 15, 2012

(65) Prior Publication Data
US 2014/0343772 A1  Nov. 20, 2014

(30) Foreign Application Priority Data
May 6, 2011  (DE) .......................... 10 2011 100 811

(51) Int. Cl.
*B60L 9/00* (2006.01)
*B60T 8/1761* (2006.01)
(Continued)

(52) U.S. Cl.
CPC ........... *B60T 8/1761* (2013.01); *B60T 8/17616* (2013.01); *B60W 10/184* (2013.01); *B60W 30/18127* (2013.01); *B60L 2220/44* (2013.01);
(Continued)

(58) Field of Classification Search
CPC .......... B60W 30/18127; B60W 10/18; B60W 10/184; B60W 30/02; Y10S 903/947; B60L 15/2009

USPC ............................................................ 701/22
See application file for complete search history.

(56) References Cited

U.S. PATENT DOCUMENTS

| 4,335,337 A | 6/1982 | Okamatsu et al. |
| 5,472,265 A | 12/1995 | Ohnuma |

(Continued)

FOREIGN PATENT DOCUMENTS

| CN | 101061020 | 10/2007 |
| CN | 101088818 | 12/2007 |

(Continued)

OTHER PUBLICATIONS

International Search Report issued by the European Patent Office in International Application PCT/EP2012/000853.
(Continued)

*Primary Examiner* — Behrang Badii
*Assistant Examiner* — Daniel L Greene
(74) *Attorney, Agent, or Firm* — Henry M. Feiereisen LLC

(57) ABSTRACT

An anti-blocking system for a vehicle having an electromotive vehicle drive unit includes one or more driving motors. During a braking process, the braking effect of the driving motors operating as a generator is limited in such a way that brake slip on at least one driving wheel is limited to a predefined threshold value. The rotational speed of each driving motor is regulated by a controllable converter associated therewith, the ABS control device constantly transmitting, to each converter, a mandatory minimum braking rotational speed for the driving motor associated with the respective converter in order to limit brake slip.

9 Claims, 1 Drawing Sheet

(51) Int. Cl.
*B60W 10/184* (2012.01)
*B60W 30/18* (2012.01)

(52) U.S. Cl.
CPC ........ *B60L 2260/28* (2013.01); *B60T 2270/602* (2013.01); *B60T 2270/604* (2013.01); *Y02T 10/7258* (2013.01); *Y10S 903/947* (2013.01)

(56) References Cited

U.S. PATENT DOCUMENTS

| | | | |
|---|---|---|---|
| 5,475,265 A | 12/1995 | Kato | |
| 5,511,859 A | 4/1996 | Kade et al. | |
| 5,615,933 A | 4/1997 | Kidston et al. | |
| 5,632,534 A | 5/1997 | Knechtges | |
| 5,775,785 A * | 7/1998 | Harris et al. | 303/156 |
| 2004/0046448 A1 | 3/2004 | Brown | |
| 2006/0220453 A1 | 10/2006 | Saito et al. | |
| 2008/0264709 A1 | 10/2008 | Fenker et al. | |
| 2010/0113215 A1 | 5/2010 | Jäger et al. | |
| 2010/0116572 A1 * | 5/2010 | Schmitt et al. | 180/65.51 |
| 2010/0198475 A1 | 8/2010 | Stölzl et al. | |

FOREIGN PATENT DOCUMENTS

| | | |
|---|---|---|
| DE | 44 35 953 A1 | 5/1995 |
| DE | 196 22 017 A1 | 12/1996 |
| DE | 195 28 628 A1 | 2/1997 |
| DE | 195 40 067 A1 | 4/1997 |
| DE | 103 41 678 A1 | 3/2004 |
| DE | 10 2007 017 821 A1 | 10/2008 |
| DE | 10 2008 017 478 A1 | 10/2008 |
| DE | 10 2008 017 480 A1 | 10/2008 |
| DE | 10 2008 058 669 A1 | 5/2010 |
| DE | 10 2009 030 816 A1 | 11/2010 |

OTHER PUBLICATIONS

Chinese Search Report with respect to counterpart Chinese patent application 201280022093.7.

Translation of Chinese Search Report with respect to counterpart Chinese patent application 201280022093.7.

* cited by examiner

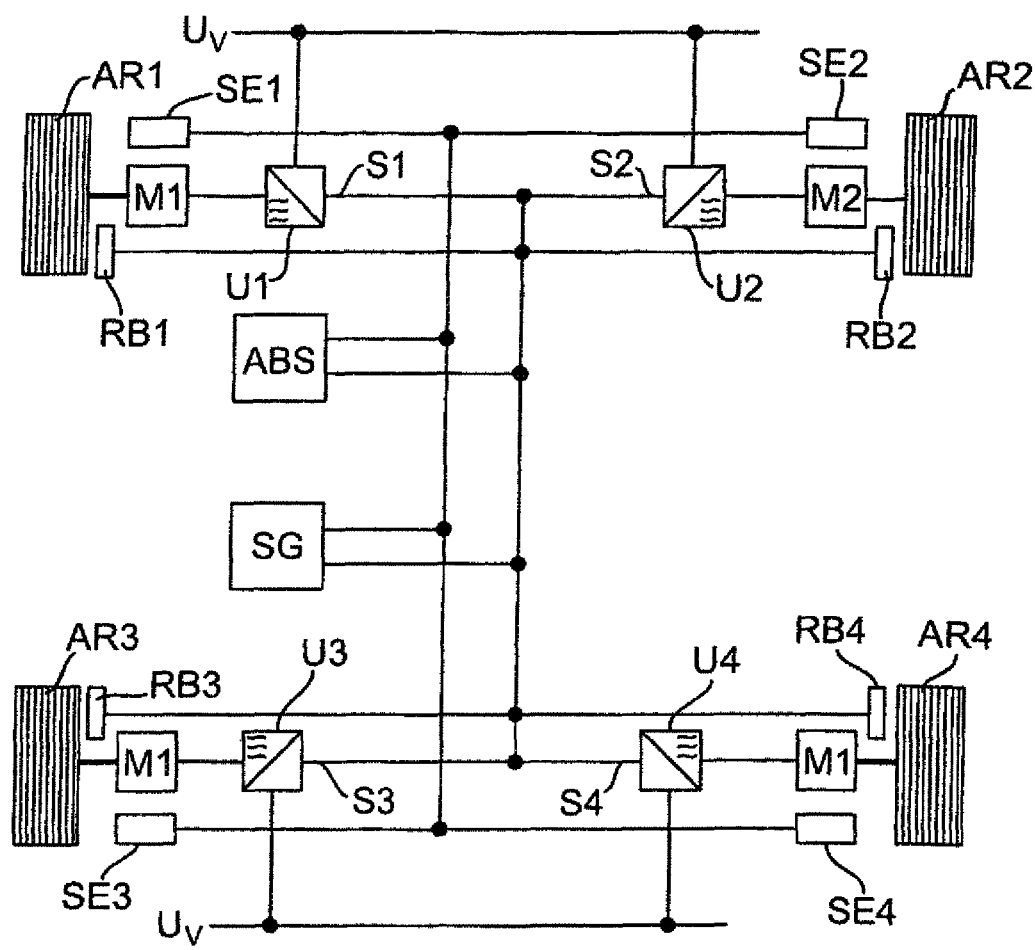

ANTI-BLOCKING SYSTEM FOR A VEHICLE WITH ELECTROMOTIVE VEHICLE DRIVE

CROSS-REFERENCES TO RELATED APPLICATIONS

This application is the U.S. National Stage of International Application No. PCT/EP2012/000853, filed Feb. 28, 2012, which designated the United States and has been published as International Publication No. WO 2012/152348 and which claims the priority of German Patent Application, Serial No. 10 2011 100 811.3, filed May 6, 2011, pursuant to 35 U.S.C. 119(a)-(d).

BACKGROUND OF THE INVENTION

The invention relates to an anti-blocking system for a vehicle with electromotive vehicle drive.

Electromotive vehicle drives that use electric machines as drive motors and can be operated in the motor mode as well as in the generator mode, have a rotational torque which is generated by the Lorentz force and which has a positive value for acceleration and a negative value for deceleration. The Lorentz force is proportional to the cross product of the current in the stator and the magnetic flux, which permeates the stator and the rotor. Owing to this circumstance, the rotational torque in an electric machine cannot only be changed by changing the current and the magnetic flux but also by the angle between the vector values relative to each other. The control of electric machines thus involves changing the voltage at the clamps of the machine so that the rotational torque resulting from the cross product assumes the desired value. In which manner the three values can be adjusted or adapted strongly depends on the respective type of machine. In rotary field machines, the current vector rotates in the stator with the same speed as the magnetic field (rotary field) for generating a rotational torque. In synchronous machines, the direction of the rotary field is predetermined by their construction. In order to generate a constant force, the rotor therefore has to rotate with the same speed at which the current in the stator rotates. When the current leads the field a positive rotational torque (acceleration) results and when it lags the field a negative torque (braking) results.

For vehicles, anti-blocking systems, in short ABS, have been known for many years, which in case of a desired maximal deceleration prevent blocking of the decelerated vehicle wheels. This achieves a high braking power for the vehicle and a driving stability that is manageable by the driver. In particular, as a result of the anti-blocking system, the vehicle can still be steered at maximal braking power.

In vehicles with electromotive vehicle drive, as it is also provided in hybrid vehicles, the electric drive motors are operated as generators during deceleration, wherein the drive motors exert a recuperative braking torque on the drive wheels. From DE 10 2008 017 480 A1 such a recuperative braking system is known in which the electric motor is operated as generator during the braking process. In order to avoid an over at the rear axle it is proposed in DE 10 2008 017 480 A1 to limit the recuperative torque so that at least at one vehicle wheel the slip does not or only to a minor degree exceed a predetermined slip threshold.

SUMMARY OF THE INVENTION

The invention is based on the objective to set forth an anti-blocking system for a vehicle with electromotive vehicle drive with which an optimal deceleration is achieved while at the same time achieving a greatest possible driving stability.

The object is solved by an anti-blocking system for a vehicle with electromotive vehicle drive, comprising converters associated in one to one correspondence with at least drive motors of the vehicle, said drive motors driving respective drive wheels and operating as generator during a braking procedure; and an anti-lock braking control device continuously transmitting to each of the converters a respective minimal braking rotational speed for each of the drive motors, wherein each said converter respectively regulates a rotational speed of the drive motor with which it is associated commensurate with the transmitted minimal braking rotational speed, thereby limiting a brake-slip at at least one of the drive wheels to a predetermined threshold value. Preferred refinements of the invention are disclosed in the dependent claims.

According to the invention, each electric drive is supplied by a controllable converter, which is assigned to the drive, and is itself continuously informed by an anti-lock control device of a minimal braking rotational speed for the associated drive motor, wherein this minimal braking rotational speed is of a magnitude so that a predetermined maximal brake slip is not exceeded. All braking rotational speeds that are above the minimal braking rotational speed are thus admissive for the converter, because this ensures that the brake slip at the wheels is not excessive. When a maximal braking power is requested by the driver via the brake pedal, the converter controls the drive motor associated therewith so that the drive motor reaches an optimal minimal braking rotational speed. Because a converter is assigned to each drive motor, an optimal braking power can be defined for each of the drive wheels. At the same time it is ensured that during maximal braking none of the drive wheels falls below a predetermined brake-slip threshold which ensures a high driving stability and steerability also in an extreme braking situation.

It is particularly advantageous to predetermine an individual minimal braking rotational speed in dependence on the actual driving speed and as the case may be further driving conditions. Not only the driving speed, but also for example the actual vehicle weight, the ambient temperature, the loading state of the vehicle and as the case may be also the respective selected operating mode of the vehicle may be used for calculating the minimal brake rotational speed for each drive wheel or each drive motor. The minimal braking rotational speed can thus also be transmitted continuously to the converters i.e., also during normal driving operation, so that the converters can ensure maintenance of a corresponding minimal braking rotational speed in the braking situation by monitoring a rotational speed threshold.

In a drive motor configured as asynchronous motor, the converter ensures that the rotary field generated in the drive motor associated with the converter is regulated so that the predetermined minimal braking rotational speed is also not fallen below in case of a predetermined maximal braking effect. When the drive motor is constructed as synchronous machine the rotational speed of the rotary field generated by the converter is regulated to the minimal braking rotational speed. In both cases the ABS control device controls the slip of the drive wheels actively, i.e., the ABS control device sets the minimal brake rotational speed associated with an optimal braking slip for the converter. In this way, the anti-slip control can be realized individually for each drive wheel in a simple manner.

In order to achieve high deceleration values and to still be able to sufficiently ensure the driving stability of the vehicle also in the case of strong braking, a braking slip is limited for each drive wheel to the range between 10% to 20% of the respective actual driving speed of the vehicle. Information regarding which value is actually appropriate can be stored in a value memory of a control device for the respective vehicle and for different driving conditions. The respective actually applicable value for the maximal brake-slip can however also be calculated by way of actual vehicle parameters such as vehicle weight, driving speed, ambient temperature. The recuperative braking torque can also be supported by the hydraulic friction brakes of the vehicle. For example a basic braking power can be provided by the friction brakes while the braking torque required in excess of this basic braking power is provided by a respective regulation of the rotational speed at the converters of the drive motors.

The braking effect provided by the friction brakes and the recuperative braking power of the drive motors can be divided in the driving dynamics regulator or another control device of the vehicle.

BRIEF DESCRIPTION OF THE DRAWING

In the following, the invention is explained in more detail by way of an exemplary embodiment shown in the drawing according to FIG. 1.

DETAILED DESCRIPTION OF PREFERRED EMBODIMENTS

The exemplary embodiment shown in FIG. 1 shows the drive and braking system of a vehicle with electromotive vehicle drive, wherein each of the four drive wheels AR1 to AR4 is driven by a respective associated electric drive motor M1 to M4. The drive motors M1 to M4 are operated as generators during a braking process, thereby generating a recuperative braking torque at the drive wheels AR1 to AR4.

The drive motors M1 to M4 are each supplied by associated converters U1 to U4 with a three-phase rotary current. On the input side, the converters U1 to U4 are connected to the supply voltage $U_v$. On the control inputs S1 to S4, the converters U1 to U4 are connected with an ABS control device ABS and a further control device SG which in the present case is the motor control device with integrated driving dynamics regulator. The ABS control device and the control device SG are additionally connected with sensor units SE1 to SE4 via control lines, which sensors transmit drive-specific information to the control devices ABS and SG. In particular the units SE1 to SE4 detect the rotational speeds of the drive wheels AR1 to AR4 with which the rotational speeds of the drive wheels AR1 to AR4 can be individually calculated in the control device ABS and/or SG. By way of comparison with the respectively actual driving speed of the vehicle, the respective slip for each of the drive wheels AR1 to AR4 can be concluded from the rotational speeds of the drive wheels AR1 to AR4. For the anti-lock system the brake slip is in particular determined during a braking process for the respective drive wheels AR1 to AR4.

For supporting the recuperative braking effect, each drive wheel AR1 to AR4 is equipped with a friction brake RB1 to RB4, which are actuated by the ABS control device ABS. The ABS control device ABS can actuate the friction brake RB1 to RB4 during a braking process so that a basic braking torque is transferred onto the drive wheels AR1 to AR4 by the friction brakes. A recuperative braking effect originating from the drive motors M1 to M4 can be superimposed over this basic braking torque. For this purpose the drive motors M1 to M4 are operated as generators and are monitored so as to not fall below a predetermined minimal braking rotational speed. This minimal braking rotational speed, which can be predetermined individually for each drive wheel AR1 to AR4, corresponds to a predetermined brake slip, which should not be exceeded as threshold value. The minimal braking rotational speed with this limits the braking slip on the drive wheels AR1 to AR4.

When for example an optimal and with this maximal brake slip of 15% is predetermined by the ABS control device ABS for the actual braking situation, the minimal braking rotational speed $n_{min}$ for the respective drive wheel can be calculated therefrom as follows:

$N_{max} = v_{max}/2\pi r$ wherein $v_{max}$ is the circumferential speed of the drive wheels increased by the predetermined maximal slip and r is the effective wheel diameter of the respective drive wheel.

At an actual driving speed of 25 m/s a speed $v_{max}=28.5$ meters per second results for a maximal slip of 14% in the present example. The value for the maximal wheel rotational speed $n_{max}$ determined in this way is determined by way of the actual driving situation of each of the drive wheels AR1 to AR45 individually and transmitted by the control device ASR to the respective associated converters U1 to U4. In this way a direct control of the converters U1 to U4 occurs for limiting the wheel rotational speed of the drive wheels AR1 to AR4.

In addition to the maximal actual admissive wheel rotational speeds, the actual value of the wheel rotational speed of the associated drive wheel can also be transmitted to the converters U1 to U4 via the control inputs S1 to S4 so that in the converter U1 to U4 a continuous actual value set value comparison can be performed for the purpose of regulation can be performed.

What is claimed is:

1. An anti-blocking system for a vehicle with electromotive vehicle drive, comprising:
   converters directly connected in one to one correspondence with drive motors of the vehicle, said drive motors driving respective drive wheels and operating as generators during a braking procedure;
   a control device directly connected with the converters and constructed for operating the drive motors during a braking process as generators by controlling the converters with a braking torque; and
   an anti-blocking control device directly connected with the converters and constructed for continuously directly transmitting to each of the converters a respective minimal braking rotational speed for each of the drive motors, wherein each said converter is constructed so that it respectively regulates a rotational speed of the drive motor with which it is directly connected commensurate with the transmitted minimal braking rotational speed, thereby limiting a brake-slip at at least one of the drive wheels to a predetermined threshold value.

2. The anti-blocking system of claim 1, wherein for a maximal braking effect an optimal brake-slip which depends on a driving condition is determined for each drive wheel, and from the optimal brake-slip the respective minimal braking rotational speed is predetermined for each drive wheel as a function of at least one of an actual driving speed of the vehicle and further vehicle parameters.

3. The anti-blocking system of claim 1, wherein the rotational speed of a rotary field generated by the converter in the drive motor associated with the converter is regulated so that the braking rotational speed does not fall below the predetermined minimal braking rotational speed.

4. The anti-blocking system of claim 1, wherein the drive motors are constructed as synchronous machines, and wherein a rotational speed of the rotary field generated by the converter does not fall below the minimal braking rotational speed of the associated drive wheel.

5. The anti-blocking system of claim 1, wherein for the maximal braking effect the maximal brake-slip for each drive wheel is limited to a value between 10% and 20% of a driving speed of the vehicle.

6. The anti-blocking system of claim 1, further comprising friction brakes supporting during the braking procedure the braking effect provided by the drive motors.

7. The anti-blocking system of claim 6, further comprising another control device, said other control device transmitting to the anti-blocking control device a basic braking torque to be generated by the friction brakes, wherein the anti-blocking control device actuates the friction brakes and adjusts a residual braking torque required for an optimal braking effect by regulating the rotational speed of the drives.

8. The anti-blocking system of claim 7, wherein the other control device is constructed as driving dynamics controller.

9. The anti-blocking system of claim 1, further comprising sensors units constructed to detect rotational speed of the drive wheels, wherein the control device and the anti-blocking control device are directly connected with the sensor units.

\* \* \* \* \*